(12) United States Patent
Sakamoto

(10) Patent No.: US 9,190,919 B2
(45) Date of Patent: Nov. 17, 2015

(54) HIGH VOLTAGE POWER SUPPLY SYSTEM AND IMAGE FORMATION APPARATUS

(71) Applicant: Oki Data Corporation, Tokyo (JP)

(72) Inventor: Noriyasu Sakamoto, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/289,705

(22) Filed: May 29, 2014

(65) Prior Publication Data

US 2014/0356005 A1    Dec. 4, 2014

(30) Foreign Application Priority Data

May 30, 2013 (JP) .................................. 2013-114081

(51) Int. Cl.
*G03G 15/00* (2006.01)
*H02M 3/335* (2006.01)

(52) U.S. Cl.
CPC ....... *H02M 3/33546* (2013.01); *G03G 15/5033* (2013.01); *G03G 15/5037* (2013.01); *G03G 15/80* (2013.01)

(58) Field of Classification Search
CPC .............. G03G 15/80; G03G 15/5033; G03G 15/5037; G03G 21/1867; H02M 3/33546; H02M 2001/0003
USPC ......................................... 399/44, 88, 94, 97
See application file for complete search history.

(56) References Cited

U.S. PATENT DOCUMENTS 5,170,210 A * 12/1992 Saruwatari ...................... 399/44
5,819,131 A * 10/1998 Kim ................................ 399/44

FOREIGN PATENT DOCUMENTS

| JP | 2000-187404 A | 7/2000 |
| JP | 2003-324954 A | 11/2003 |
| JP | 2012-118254 A | 6/2012 |

OTHER PUBLICATIONS

Machine translation of reference Komori (JP 2003-324,954 A), Listed in IDS, Pub Date Nov. 14, 2003.*

* cited by examiner

*Primary Examiner* — Rodney Bonnette
(74) *Attorney, Agent, or Firm* — Marvin A. Motsenbocker; MOTS Law, PLLC

(57) ABSTRACT

A high voltage power supply system includes: a high voltage power supply; a current detector; a voltage detector; a conversion section configured to obtain a converted-current value by dividing a detected-current voltage value by a predetermined resistance value; a selector configured to select one of the detected-current voltage value and the detected-voltage voltage value; a resistance variable section configured to change the predetermined resistance value; a temperature detector; a humidity detector; and a control section configured to create a voltage setting signal, a selection signal, and a resistance variable signal on the basis of the detected-voltage voltage value, the detected-temperature value, and the detected-humidity value, and to apply the voltage setting signal to the high voltage power supply, the selection signal to the selector, and the resistance variable signal to the resistance variable section.

6 Claims, 11 Drawing Sheets

HIGH VOLTAGE POWER SUPPLY SYSTEM OF FIRST EMBODIMENT

IMAGE FORMATION APPARATUS OF FIRST EMBODIMENT

ELECTROPHOTOGRAPHIC PROCESS

Fig.4 CIRCUIT DIAGRAM EXAMPLE OF HIGH VOLTAGE POWER SUPPLY SYSTEM IN Fig. 1

FLOWCHART FOR PROCESSING OF HIGH VOLTAGE POWER SUPPLY SYSTEM IN Fig. 1

FLOWCHART FOR PROCESSING OF HIGH VOLTAGE POWER SUPPLY SYSTEM IN Fig. 9

HIGH VOLTAGE POWER SUPPLY SYSTEM AND IMAGE FORMATION APPARATUS

CROSS REFERENCE TO RELATED APPLICATIONS

This application claims priority based on 35 USC 119 from prior Japanese Patent Application No. 2013-114081 filed on May 30, 2013, entitled "HIGH VOLTAGE POWER SUPPLY SYSTEM AND IMAGE FORMATION APPARATUS", the entire contents of which are incorporated herein by reference.

BACKGROUND OF THE INVENTION

1. Field of the Invention

The disclosure herein relates to a high voltage power supply system that supplies a high voltage to a transfer roller, and an image formation apparatus using the same.

2. Description of Related Art

Japanese Patent Application Publication No. 2003-324954 discloses a conventional high voltage power supply system that includes a transfer roller configured to transfer a toner image formed on a photosensitive drum onto a recording medium, and supplies a voltage to the transfer roller. The high voltage power supply system is configured to change an output voltage in accordance with a changing current value that will flow into the transfer roller, based only on the type of recording medium.

SUMMARY OF THE INVENTION

With the conventional configuration of a high voltage power supply system as used, for example, in an image formation apparatus, it is difficult to obtain a good result of an image formation when the ambient temperature and the ambient humidity are changed. This is because a change in the amount of the output voltage supplied to the transfer roller is switched only based on the type of the recording medium.

An object of an embodiment of the invention is to supply the load with the output voltage and the output current that are suitable for the ambient temperature and the ambient humidity of the load, even when the ambient temperature and the ambient humidity of the load are changed.

An aspect of the invention is a high voltage power supply system. The high voltage power supply system includes: a high voltage power supply configured to output an output voltage and an output current to be applied to a load on the basis of a voltage setting signal; a current detector configured to detect the output current, and to create and output a detected-current voltage value; a conversion section configured to obtain a converted-current value by dividing the detected-current voltage value by a predetermined resistance value, and output the converted-current value; a voltage detector configured to convert a sum of a detected-voltage current value of the output voltage and the converted-current value into a voltage, and output the obtained voltage as a detected-voltage voltage value; a selector configured to select one of the detected-current voltage value and the detected-voltage voltage value on the basis of a selection signal, and output the selected voltage value; a variable resistance section configured to change the predetermined resistance value on the basis of a variable resistance signal; a temperature detector configured to detect an ambient temperature of the load, and output the detected temperature as a detected-temperature value; a humidity detector configured to detect an ambient humidity of the load, and output the detected humidity as a detected-humidity value; and a control section configured to create the voltage setting signal, the selection signal, and the variable resistance signal on the basis of the detected-voltage voltage value, the detected-temperature value, and the detected-humidity value, and to apply the voltage setting signal to the high voltage power supply, the selection signal to the selector, and the variable resistance signal to the resistance variable section.

According to the above aspect of the invention, even when the ambient temperature and the ambient humidity of the load are changed, the output voltage and the output current that are suitable for the ambient temperature and the ambient humidity can be supplied to the load.

DETAILED DESCRIPTION OF EMBODIMENTS

Figure 1:
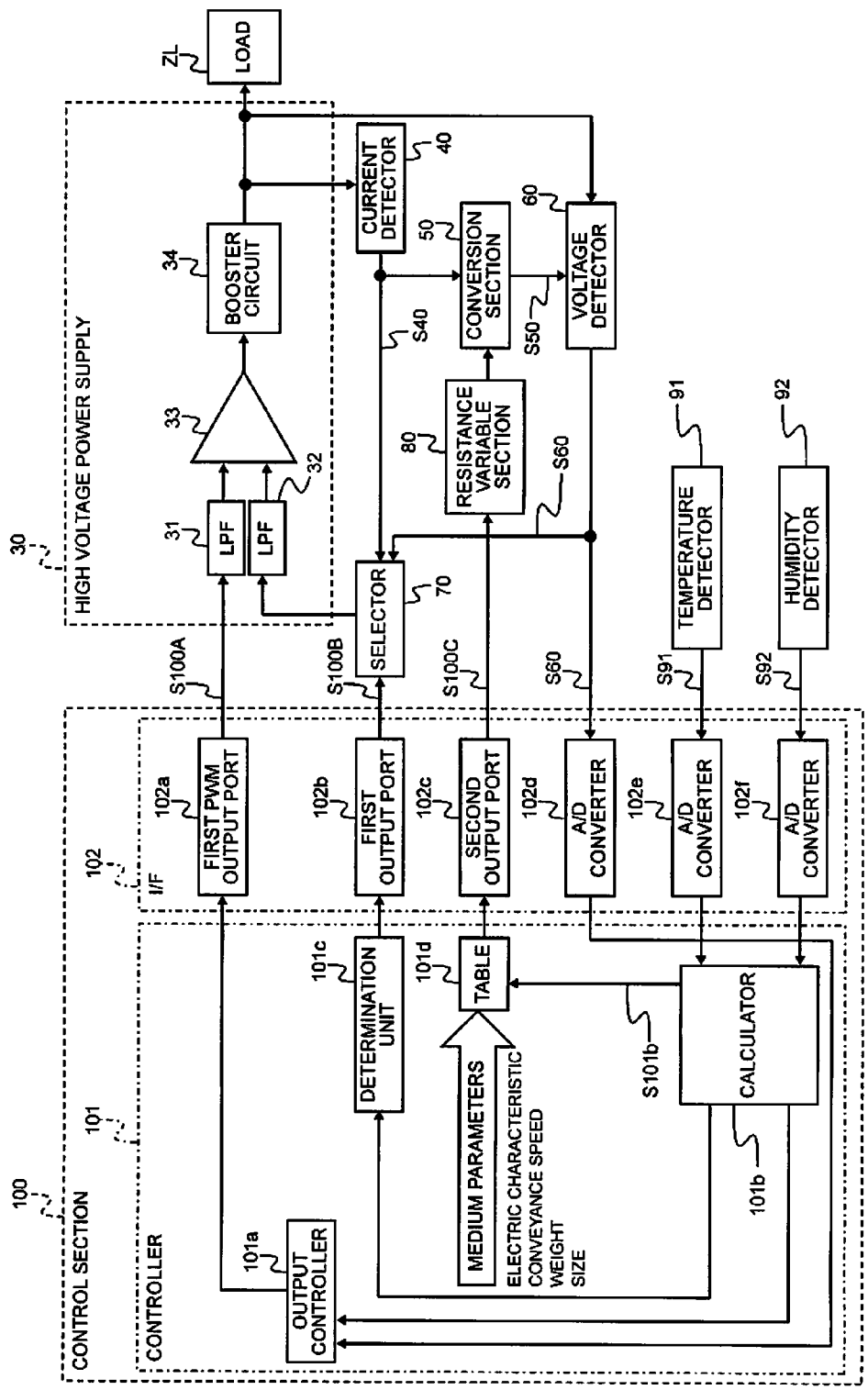
FIG. 1 is a block diagram schematically illustrating a high voltage power supply system including the high voltage power supply 30 in FIG. 3.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Modes to implement the invention can be clearly understood by reading the following description of the preferred embodiments with reference to the attached drawings. Note that, the drawings are provided only for illustrative purposes, and are not intended to limit the scope of the invention.

First Embodiment

Configuration of First Embodiment

Figure 2:
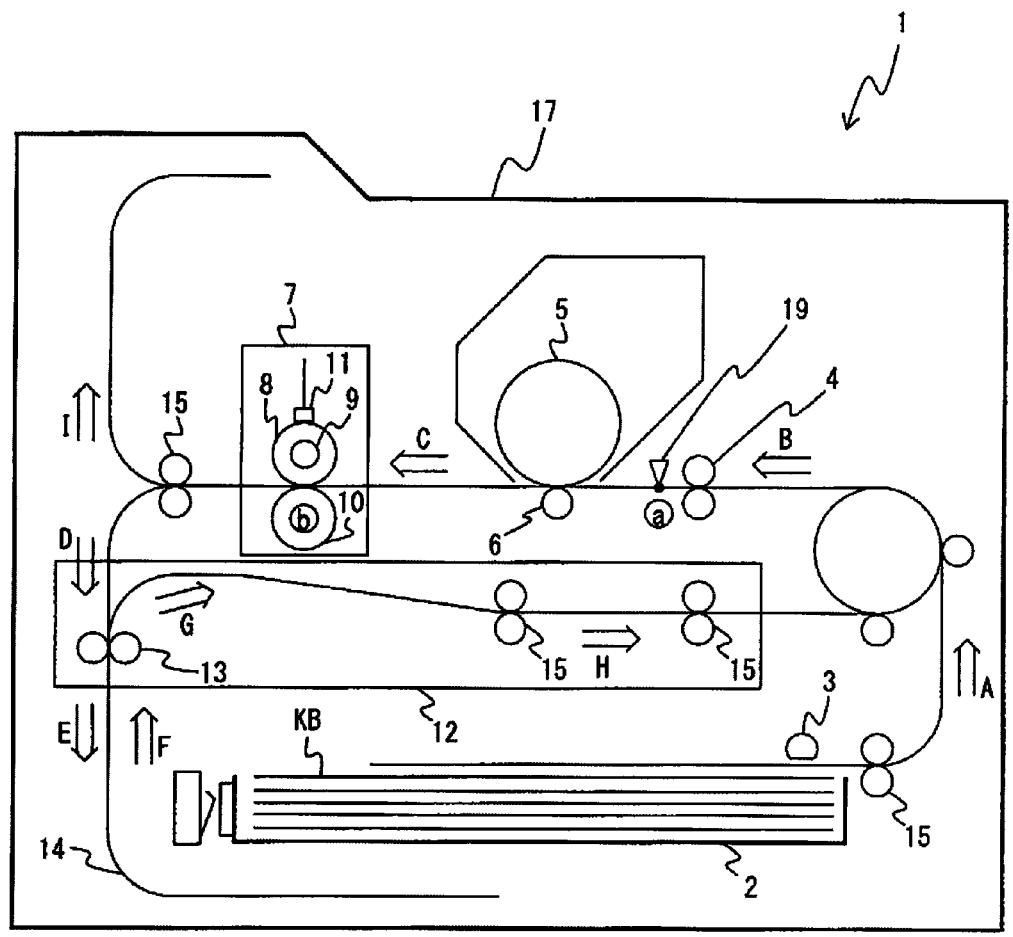
FIG. 2 is a structural view schematically illustrating image formation apparatus 1 according to a first embodiment of the invention.

FIG. 2 is a structural view schematically illustrating image formation apparatus 1 according to a first embodiment of the invention.

Image formation apparatus 1 is, for example, an electrophotographic printer. Paper feed cassette 2 houses therein recording media KB, such as sheets of paper, and is provided in the lower portion of image formation apparatus 1. Paper feed roller 3 sends out recording medium KB from paper feed cassette 2 in the direction of a conveyance path that is indicated by arrow A and is provided in the right upper portion of paper feed cassette 2. Registration rollers 4 convey recording medium KB sent out by paper feed roller 3 in the direction of arrow B and arrow C and are provided at the downstream side of the conveyance path of paper feed roller 3.

Photosensitive drum 5 serves as an image carrier that forms a toner image as a developer image and is disposed at the upper side of a portion between arrow B and arrow C in the conveyance path of recording medium KB. Transfer roller 6 transfers the toner image onto recording medium KB and is disposed at the lower side of the portion between arrow B and arrow C therein. Photosensitive drum 5 and transfer roller 6 constitute a nip unit that nips recording medium KB therebetween to advance it to the downstream side of the conveyance path. Fixation device 7 is provided at the downstream side of the nip unit and is configured to fixes the toner image transferred onto recording medium KB and. Fixation device 7 includes heat roller 8 that heats recording medium KB on which the toner image is formed, heater 9 that heats heat roller 8, pressurization roller 10 that is brought into pressure contact with heat roller 8 to apply pressure to recording medium KB, and thermistor 11 that detects the surface temperature of heat roller 8.

Reverse device 12 reverses the front surface and the rear surface of recording medium KB and is provided in a position between paper feed cassette 2 and the conveyance path indicated by arrow B and arrow C. Reverse device 12 is provided with reverse rollers 13 that can rotate in clockwise and counterclockwise directions, reverse switchback unit 14 that makes recording medium. KB switchback in the direction of arrow D and arrow E when recording medium KB is reversed, and conveyance rollers 15 that convey reversed recording medium. KB to the direction of arrow F, arrow G, and arrow H.

Stacker 17 is provided on the upper surface of image formation apparatus 1. Recording medium KB on which the image(s) is (are) formed on one side or both sides thereof are conveyed in the direction of arrow I to be discharged from stacker 17. Medium sensor 19 detects a position of recording medium KB and is provided at the downstream side of registration rollers 4.

Figure 3:
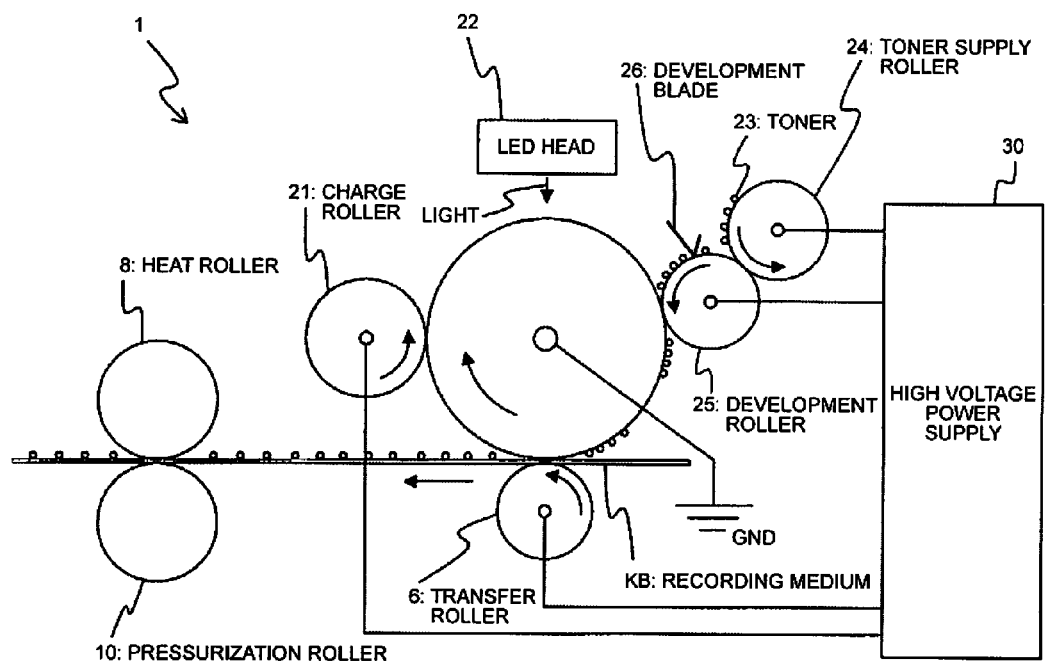
FIG. 3 is a view for explaining an electrophotographic process of image formation apparatus 1 in FIG. 2.

FIG. 3 is a view for explaining an electrophotographic process of image formation apparatus 1 in FIG. 2. Image formation apparatus 1 includes charge roller 21 that causes electrostatic charges to be charged on the surface of photosensitive drum 5. Light-emitting diode (hereinafter, referred to as "LED") head 22 is provided above photosensitive drum 5 onto which the electrostatic charges are charged by charge roller 21. LED head 22 exposes the electrostatic charges on photosensitive drum 5 to light on the basis of image data to form an electrostatic latent image. Toner supply roller 24 supplies toner 23 as a developer and is provided right above photosensitive drum 5. Development roller 25 supplies the toner to the electrostatic latent image formed on photosensitive drum 5 to form a toner image and is provided between toner supply roller 24 and photosensitive drum 5. In addition, development blade 26 adjusts the amount of toner 23 supplied to photosensitive drum 5 and is provided in the upper portion of development roller 25. Charge roller 21, development roller 25, and transfer roller 6 are brought into contact with photosensitive drum 5. In addition, high voltage power supply 30 supplies voltages to charge roller 21, transfer roller 6, toner supply roller 24, and development roller 25.

FIG. 1 is a block diagram schematically illustrating the high voltage power supply 30 in FIG. 3, and a control section thereof. A high voltage power supply system in image formation apparatus 1 includes high voltage power supply 30 configured to output high-voltage output voltage Vo and output current Io on the basis of a voltage setting signal S100A given by control section 100. High voltage power supply 30 is configured to control output voltage Vo or output current Io at the output side such that a difference between voltage setting signal S100A and output signal S70 from selector 70 can become closer to zero, and include low-pass filters (hereinafter, referred to as "LPF") 31, 32, error amplifier 33, booster circuit 34, and the like. High voltage power supply 30 at the output side is connected to load ZL serving as transfer roller 6 and photosensitive drum 5, so that output voltage Vo and output current Io are supplied from high voltage power supply 30 to load ZL.

Current detector 40 and voltage detector 60 are connected to high voltage power supply 30 at the output side. Current detector 40 is configured to detect output current Io to create a detected-current value S40, and output detected-current value S40 thus created to conversion section 50 and selector 70. Conversion section 50 is configured to multiply detected-current value S40 by a predetermined resistance value to obtain converted-voltage value S50, and output it. Voltage detector 60 is configured to add a detection value of output voltage Vo and converted-voltage value S50 to obtain detected-voltage value S60, and output it to selector 70 and control section 100.

Selector 70 is configured to select any one of detected-current value S40 and detected-voltage value S60 on the basis of selection signal S100B given by control section 100, and output the selected one. Resistance variable section 80 is configured to change the predetermined resistance value on the basis of resistance variable signal S100C given by control section 100 and is connected to conversion section 50. Resistance variable section 80 varies the predetermined resistance value by which detected-current value S40 is multiplied in conversion section 50.

When selector 70 selects detected-current value S40, voltage setting signal S100A and detected-current value S40 are inputted into high voltage power supply 30, and output current Io is controlled such that a difference between voltage setting signal S100A and detected-current value S40 can become small. On the other hand, when selector 70 selects detected-voltage value S60, voltage setting signal S100A and detected-voltage value S60 are inputted into high voltage power supply 30, and output voltage Vo is controlled such that a difference between voltage setting signal S100A and detected-voltage value S60 can become small.

Temperature detector 91 and humidity detection section 92 are connected to control section 100. Temperature detector 91 is configured to detect the ambient temperature of load ZL to input detected-temperature value S91 thereto. Humidity detector 92 is configured to detect the ambient humidity of load ZL and to input detected-humidity value S92 thereto.

Control section 100 is configured to include controller 101 that controls output current Io or output voltage Vo from high voltage power supply 30 by voltage setting signal S100A or the like, and interface (hereinafter, referred to as "I/F") 102 for controller 101, high voltage power supply 30, and the like. Controller 101 is configured to create voltage setting signal S100A, selection signal S100B, and resistance variable signal S100C on the basis of detected-voltage value S60, detected-temperature value S91, and detected-humidity value S92, and to apply voltage setting signal S100A to high voltage power supply 30, apply selection signal S100B to selector 70, and apply resistance variable signal S100C to resistance variable section 80.

I/F 102 includes first PWM output port 102a that outputs voltage setting signal S100A outputted from controller 101 as a pulse width modulation (hereinafter, referred to as "PWM") signal, and first output port 102b and second output port 102c from which selection signal S100B and resistance variable signal S100C outputted from controller 101 are respectively outputted at a logic "H" level or logic "L" level. In addition, I/F 102 includes analog/digital (hereinafter, referred to as "A/D") converters 102d, 102e, and 102f that convert detected-voltage value S60, detected-temperature value S91, and detected-humidity value S92 being analog values into digital values, and input the digital values into controller 101, respectively.

Controller 101 includes output controller 101a, calculator 101b, determination unit 101c, table 101d, and the like. Output controller 101a creates voltage setting signal S100A, and outputs voltage setting signal S100A thus created to high voltage power supply 30 via first PWM output port 102a. Calculator 101b obtains the steam quantity from detected-temperature value S91 and detected-humidity value S92 as the converted digital values. Determination unit 101c determines to select which one of detected-current value S40 and detected-voltage value S60 on the basis of the steam quantity obtained by calculator 101b, and outputs selection signal S100B. Table 101d stores therein resistance variable signal S100C corresponding to the steam quantity, and outputs resistance variable signal S100C in accordance with the given steam quantity. Table 101d is configured to correct resistance variable signal S100C by medium parameters such as electric characteristics of recording medium KB such as the dielectric constant and the leakage current, the conveyance speed for recording medium KB, the weight per unit area of recording medium KB, and the size of recording medium KB.

Figure 4:
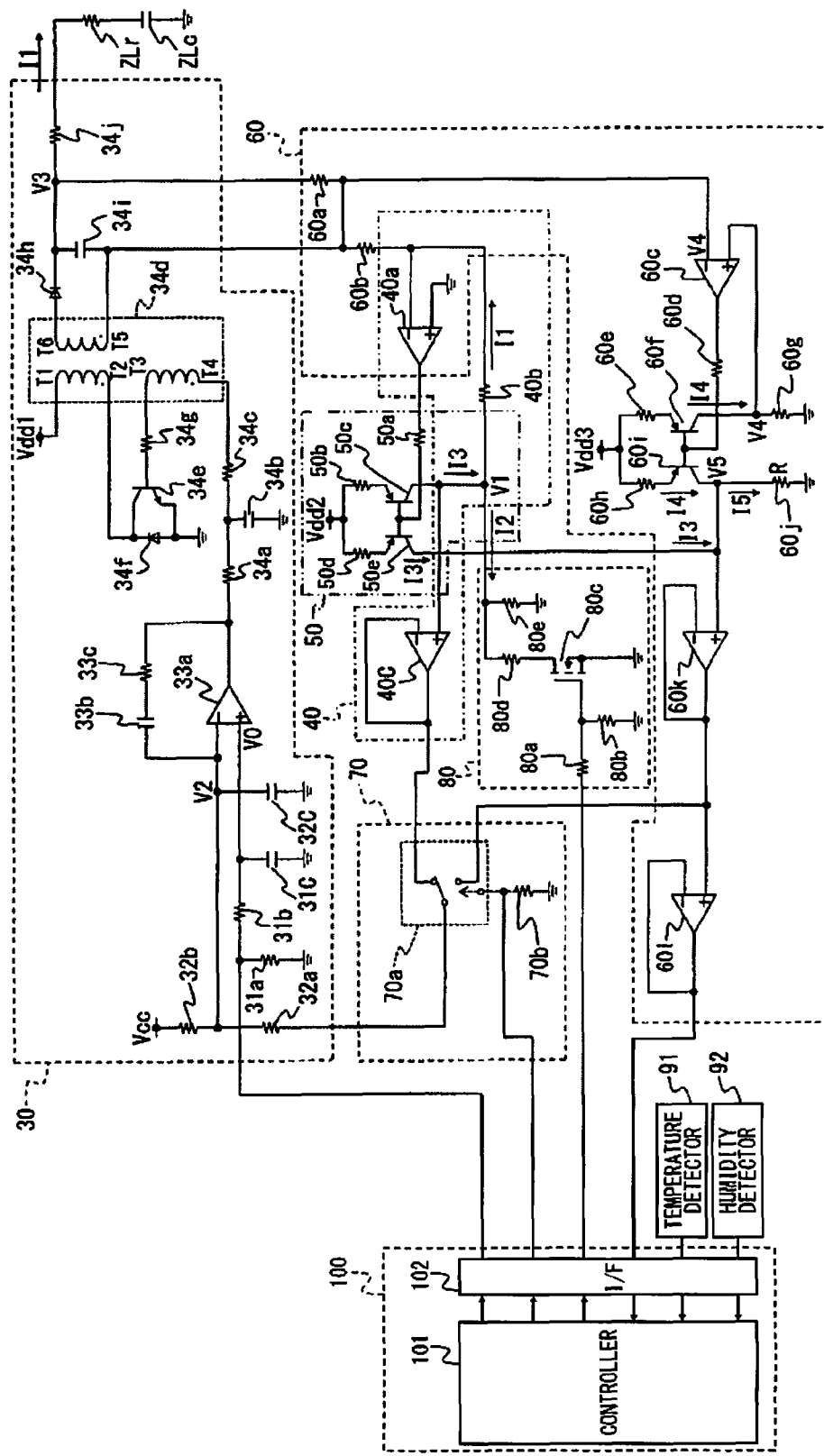
FIG. 4 is a circuit diagram illustrating an example of the high voltage power supply system in FIG. 1.

FIG. 4 is a circuit diagram illustrating an example of the high voltage power supply system in FIG. 1. The high voltage power supply system is provided with high voltage power supply 30. High voltage power supply 30 is configured to include two LPFs 31, 32, error amplifier 33, and booster circuit 34. LPF 31 is configured to smooth PWM signal S100A as a voltage setting signal given by the control section and to output it to a non-inversion input terminal (hereinafter, referred to as "+terminal") of operational amplifier 33a. LPF 31 includes two resistances 31a, 31b, and capacitor 31c. LPF 32 is configured to smooth either one of detected-current value S40 and detected-voltage value S60 given by selector 70 and to output the selected one to an inversion input terminal (hereinafter, referred to as "−terminal") of operational amplifier 33a. LPF 32 includes two resistances 32a, 32b, and capacitor 32c.

Error amplifier 33 is configured to control the voltage of an output terminal such that the input voltages to the +terminal and the −terminal of operational amplifier 33a can be equal to each other based on the principle of virtual grounding. Capacitor 33b and resistance 33c are connected in series between the output terminal and the −terminal of operational amplifier 33a to provide a feedback path of current.

Booster circuit 34 is configured to output high-voltage output voltage Vo on the basis of the voltage at the output terminal of operational amplifier 33a. The output terminal of operational amplifier 33a is connected to one end T4 in a primary winding of voltage conversion transformer 34d via resistance 34a, capacitor 34b, and resistance 34c. The other end T1 in the primary winding of voltage conversion transformer 34d is pulled up by power supply voltage Vcc. NPN-type transistor 34e and diode 34f are connected to intermediate terminal T3 in the primary winding of voltage conversion transformer 34d. Diode 34f is connected in the direction from an emitter to a collector of transistor 34e. Resistance 34g is connected between a base of transistor 34e and the primary winding. The collector of transistor 34e is pulled up by logic power supply voltage Vcc at DC 5 V, for example, via intermediate terminal T2 in the primary winding, and the emitter of transistor 34e is grounded. A rectification circuit including diode 34h and capacitor 34i is connected to secondary-side terminals T5, T6 of voltage conversion transformer 34d, and an output unit of the rectification circuit is connected to resistance load ZLr corresponding to transfer roller 6 via resistance 34j. In addition, resistance load ZLr is grounded via capacity load ZLc corresponding to photosensitive drum 5.

Current detector 40 includes operational amplifier 40a with a +terminal being grounded, resistance 40b with one end being connected to a −terminal of operational amplifier 40a, and operational amplifier 40c in a voltage follower connection with a +terminal being connected to the other end of resistance 40b. Based on the principle of virtual grounding in operational amplifier 40a, a detection voltage, as a result of output current Io, is induced at a connection point in resistance 40b with the +terminal of operational amplifier 40c. Current detector 40 outputs the induced detection voltage to conversion section 50, and to selector 70 as detected-current voltage value S40 through the voltage follower configured by operational amplifier 40c.

Conversion section 50 includes a current mirror circuit that includes resistance 50a with one end being connected to an output terminal of operational amplifier 40a, two resistances 50b, 50d, and two transistors 50c, 50e with bases being connected to each other. The other end of resistance 50a is connected to the common base of transistors 50c, 50e. Conversion section 50 creates a converted-current value S50 by the current mirror circuit from a current value that is changed depending on the resistance value connected to the connection point between the resistance 40b in current detector 40 and the +terminal of operational amplifier 40c. Conversion section 50 outputs converted-current value S50 to voltage detector 60.

Voltage detector 60 is configured by resistance 60a with one end being connected to the output unit of the rectification circuit configured by diode 34h and capacitor 34i in high voltage power supply 30, resistance 60b with one end being connected to the other end of resistance 60a, and operational amplifier 40a with the −terminal being connected to the other end of resistance 60b. A connection point between resistance 60a and resistance 60b is connected to the −terminal of operational amplifier 60c. The +terminal of operational amplifier 60c is connected to resistance 60g, and is grounded via resistance 60g. An output terminal of operational amplifier 60c is connected, via resistance 60d, to a base common to transistors 60f, 60i in a current mirror circuit that is configured by two resistances 60e, 60h, two PNP-type transistors 60f, 60i, and two resistances 60g, 60j. A voltage at a connection point between the +terminal of operational amplifier 60c and resistance 60g produces a current through resistance 60g, and a current that is the same as the current flowing through resistance 60g flows through transistor 60i by the current mirror circuit in voltage detector 60. A current value of the current flowing through transistor 60i is a detected-voltage current value of output voltage Vo. In other words, it is the current produced as a function of the value of output voltage Vo The collector of transistor 60i is grounded via resistance 60j.

At a connection point between the collector of transistor 60i and resistance 60j, converted-current value S50 inputted from conversion section 50 and the detected-voltage current value of output voltage Vo are added, and detected-voltage voltage value S60 obtained by multiplying the added current value by resistance 60j is generated at a connection point between the collector of transistor 60i and resistance 60j. Detected-voltage voltage value S60 is configured to be respectively outputted to selector 70 and to control section 100 via two operational amplifiers 60k, 60l in a voltage follower connection.

Selector 70 is configured to include analog switch 70a that selects either one of detected-current voltage value S40 and detected-voltage voltage value S60 on the basis of selection signal S100B to output the selected voltage value to high voltage power supply 30, and to resistance 70b connected to a control terminal of analog switch 70a to which selection signal S100B is inputted. The control terminal of analog switch 70a is grounded via resistance 70b.

Resistance variable section 80 is configured to include two resistances 80a, 80b that divide the voltage of resistance variable signal S100C, n-type electric field effect transistor (hereinafter, referred to as "n-type MOSFET") 80c serving as a switch element to be subjected to an on/off control between a drain and a source on the basis of a divided voltage of resistance variable signal S100C inputted to a gate, and two resistances 80d, 80e that determine a predetermined resistance value. When n-type MOSFET 80c is turned on, resistance 80d is grounded, so that the predetermined resistance value is a combined resistance value of resistance 80d and resistance 80e in a parallel connection. On the other hand, when n-type MOSFET 80c is turned off, the predetermined resistance value is a resistance value of resistance 80e.

In addition, temperature sensor 91 serving as a temperature detector, and humidity sensor 92 serving as a humidity detector are connected to control section 100.

(Operation in First Embodiment)

Firstly, (I) an overall operation of image formation apparatus 1 and (II) an operation of the high voltage power supply system are separately described.

(I) Overall Operation of Image Formation Apparatus 1

With reference to FIG. 2 and FIG. 3, an operation is described in which recording medium KB is led from paper feed cassette 2 to stacker 17 in image formation apparatus 1.

Firstly, in FIG. 2, recording medium KB housed in paper feed cassette 2 is conveyed to fixation device 7 through registration rollers 4 on the basis of position information by medium sensor 19.

When double-sided printing is performed, recording medium KB is conveyed to reverse rollers 13 in the direction of arrow D to pass through reverse rollers 13 rotating in a normal direction, and is temporarily conveyed to reverse switchback unit 14 in the direction of arrow E. When reverse rollers 13 rotate in a reverse rotation, recording medium KB is conveyed in the directions of arrow F, arrow G, and arrow H again to registration rollers 4 by way of reverse device 12.

Recording medium KB with a toner image being transferred on a rear surface thereof by photosensitive drum 5, and transfer roller 6 again on the basis of position information by medium sensor 19, pass through fixation device 7 so that the toner image is fixed thereto, and is conveyed to stacker 17 in the direction of arrow I by way of conveyance rollers 15.

In FIG. 3, charge roller 21 uniformly charges the surface of photosensitive drum 5 that is rotating, and LED head 22 exposes the surface of photosensitive drum 5 to light on the basis of position information by medium sensor 19. The LED head exposes the surface of photosensitive drum 5 to light to form an electrostatic latent image. Toner supply roller 24 moves toner 23 to development roller 25, development blade 26 makes toner 23 uniform, and development roller 25 forms a toner image. In addition, transfer roller 6 transfers the toner image formed on the surface of photosensitive drum 5 onto recording medium KB, and heat roller 8 and pressurization roller 10 fix toner 23 onto recording medium KB. High voltage power supply 30 supplies a high voltage of 100 V or higher to charge roller 21, development roller 25, toner supply roller 24, and transfer roller 6.

(II) Operation of High Voltage Power Supply System

Figure 5:
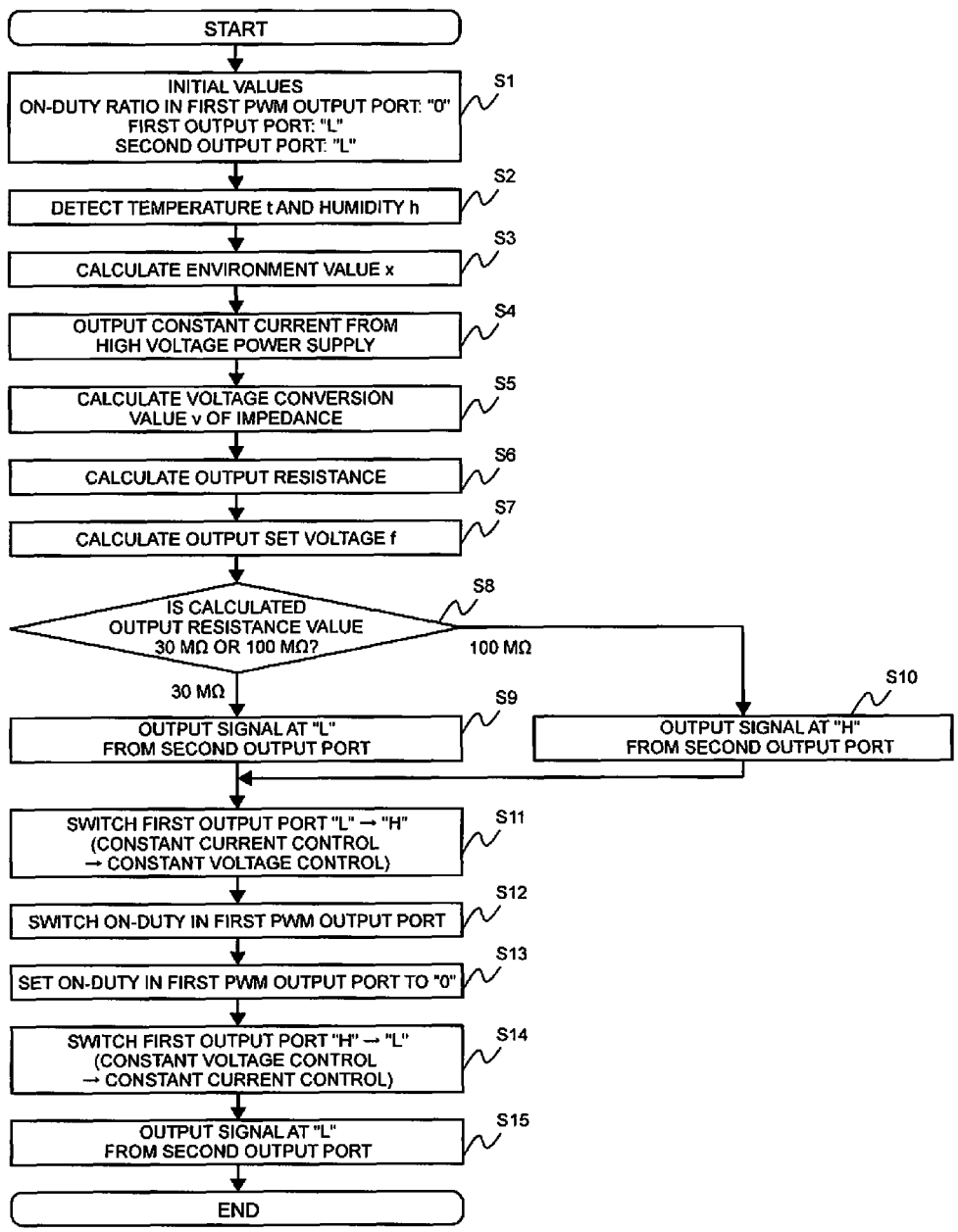
FIG. 5 is a flowchart illustrating a process of the high voltage power supply system in FIG. 1.

FIG. 5 is a flowchart illustrating a process of the high voltage power supply system in FIG. 1.

With reference to FIG. 1 and FIG. 4, and along with the flowchart illustrated in FIG. 5, in single-sided printing, the circuit operation is described of the high voltage power supply system from before high voltage power supply 30 starts to supply a voltage and a current to transfer roller 6, to when it stops the supply.

In the flowchart illustrated in FIG. 5, upon starting the process, the process proceeds to Step S1. At Step S1, before the supply of a voltage is started, output signals from first PWM output port 102a, first output port 102b, and second output port 102c in I/F 102 illustrated in FIG. 1 are initialized, and the process proceeds to Step S2. Voltage setting signal S100A is a PWM signal that performs a control on the basis of the ratio of an "H" level relative to one cycle in a square wave of a fixed pulse width in a constant cycle. The initialized voltage setting signal S100A is a PWM signal with the "H" level ratio being "0", or in other words, the signal is at the "L" level. Both of initialized selection signal S100B and resistance variable signal S100C are also at the "L" level.

At Step S2, A/D converter 102e converts an electric signal detected by temperature sensor 91 into a digital value to detect the ambient temperature (hereinafter, simply referred to as "temperature") t and A/D converter 102f converts an electric signal detected by humidity sensor 92 into a digital value to detect the ambient humidity (hereinafter, simply referred to "humidity") h, and the process proceeds to Step S3. At Step S3, environment value x is calculated on the basis of detected temperature t and humidity h, and the process proceeds to Step S4. Here, a method of calculating environment value x is described.

Saturated steam quantity e and steam quantity a are calculated from temperature t and humidity h by the following formulae (1) and (2), respectively:

$$e = 6.11 \times 10 \exp\{7.5 \times t/(t+237.3)\} \quad (1), \text{ and}$$

$$a = 217 \times e(t)/(t+273.15) \times h/100 \quad (2).$$

Environment value x is determined on the basis of steam quantity a calculated by the formula (2) from Table 1.

TABLE 1

| Calculation Table for Environment Value | |
|---|---|
| Environment Value x | Steam Quantity a |
| 1 | $18 \leq a$ |
| 2 | $15 \leq a < 18$ |
| 3 | $12 \leq a < 15$ |
| 4 | $9 \leq a < 12$ |
| 5 | $7 \leq a < 9$ |
| 6 | $5 \leq a < 7$ |
| 7 | $3 \leq a < 5$ |
| 8 | $a < 3$ |

Figure 6:
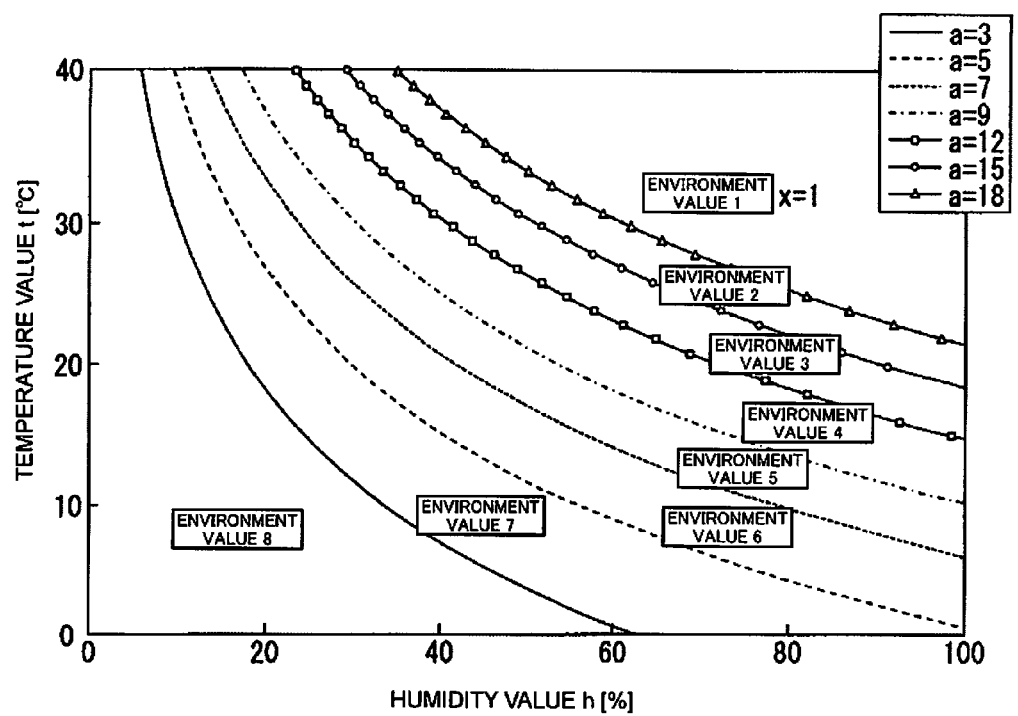
FIG. 6 is a characteristic graph illustrating a relation among the temperature-humidity, steam quantity a, and environment values.

FIG. 6 is a characteristic graph illustrating a relation between temperature t and humidity h, and environment value x. Boundary lines of environment values x are illustrated in FIG. 6 where the horizontal axis represents humidity h [%] and the longitudinal axis represents temperature [° C.].

An impedance of transfer roller 6 is in correlation with steam quantity a, and the impedance is raised to several hundreds MΩ at low temperature and low humidity, while the impedance is lowered to several tens MΩ at high temperature and high humidity. Due to the environmental variation by temperature t and humidity h, the impedance of transfer roller 6 varies largely. Therefore, the output set voltage of high voltage power supply 30 is necessary to be varied in response to the variation of the impedance. The output set voltage is preferably set high at low temperature and low humidity because the impedance of transfer roller 6 is high, while the output set voltage is preferably set low at high temperature and high humidity because the impedance of transfer roller 6 is low.

At Step S4, when a conveyance operation of recording medium. KB is started, controller 101 performs the operation of detecting a resistance value of transfer roller 6. The operation is described. Controller 101 performs a constant current control such that a predetermined current value I1 flows from high voltage power supply 30 to transfer roller 6. Controller 101 outputs an on-duty PWM signal in accordance with the value of predetermined current value I1. First PWM output port 102a is supplied with voltage Vcc from the logic power supply, and outputs voltage setting signal S100A of voltage Vcc at the "H" level, and which is of 0 V at the "L" level. When the voltage of voltage setting signal S100A is at the "H" level, a charging current flows to capacitor 31c via resistance 31b. On the other hand, when the voltage of voltage setting signal S100A is at the "L" level, a discharging current flows from capacitor 31c to first PWM output port 102a via resistance 31b. By repeating this operation, potential V0 at the +terminal of operational amplifier 33a becomes constant. When potential V2 at the −terminal of operational amplifier 33a is lower than potential V0 at the +terminal thereof, the output terminal of operational amplifier 33a outputs a signal at the "H" level. In contrast, when potential V2 at the −terminal of operational amplifier 33a is higher than potential V0 at the +terminal thereof, the output terminal of operational amplifier 33a outputs a signal at the "L" level.

When first PWM output port 102a starts to output a signal, potential V0 is lower than potential V2. Accordingly, the output terminal of operational amplifier 33a is at the "H" level, and a base current of transistor 34e flows via two resistances 34a, 34c, transformer 34d, and resistance 34g. With analog power supply Vdd1 (for example a voltage of 24 V), a direct current (DC) flows from terminal 1 to terminal 2 of transformer 34d and as a collector current into transistor 34e. A high-voltage voltage is induced in terminal 6 of transformer 34d on the basis of the ratio between the number of windings from terminal 1 to terminal 2 of transformer 34d and the number of windings from terminal 5 to terminal 6 of transformer 34d. The induced high-voltage voltage is rectified by diode 34h and is smoothed by capacitor 34i, so that current I1 flows via resistance 34j to loads ZLr and ZLc, corresponding to transfer roller 6 and photosensitive drum 5. A voltage is induced in terminal 3 of transformer 34d on the basis of the ratio between the number of windings from terminal 5 to terminal 6 of transformer 34d and the number of windings from terminal 3 to terminal 4 of transformer 34d. When the induced voltage flows into capacitor 34b via resistance 34c, the voltage potential at terminal 3 of transformer 34d becomes a negative voltage, a base voltage at transistor 34e also becomes a negative voltage, and the collector current in transistor 34e stops flowing. A voltage of a counterelectromotive force is generated at terminal 1 of transistor 34d, so that current flows from terminal 1 to terminal 2 of transformer 34d. The operation is repeated thereinafter. Current I1 flows in accordance with the value of potential V0, and gradually becomes a constant current value.

Because the +terminal of operational amplifier 40a is grounded and the −terminal of operational amplifier 40a is virtually grounded, the output terminal then of operational amplifier 40a is at the "L" level, and apart of the base current flows from the common base of transistors 50c and 50e via resistance 50 into the output terminal of operational amplifier 40a. Voltage Vdd2 is fed from the second analog power supply, and a collector current I3 flows into transistor 50c via resistance 50b. Collector current I3 is divided into current I2 that flows into resistance 80e and current I1 that flows into resistance 40b as in the following formula:

$$I3 = I1 + I2 \tag{3}$$

Here, the value of current I3 is equivalent to converted-current value S50.

Current I1 that flows into resistance 40b has a value the same as the value of current I1 that flows into transfer roller 6. Because the −terminal of operational amplifier 40a is virtually grounded, collector potential V1 of transistor 50c is calculated from current I1 and resistance value R1 of resistance 40b by the following formula:

$$V1 = I1 \times R1 \tag{4}$$

V1 calculated by the formula (4) is equivalent to detected-current voltage value S40.

Here, because the output from second output port 102c is at the "L" level, no current flows into n-type MOSFET 80c, and a current flows only into resistance 80e. Current value I2 that flows into resistance 80e is calculated by the following formula.

$$I2 = V1/R2 \tag{5}$$

where R2 denotes a resistance value of resistance 80e.

The potential at the +terminal of operational amplifier 40c also becomes V1, and the potential at the output terminal of operational amplifier 40c also becomes V1 due to its voltage follower configuration in which the −terminal and the output terminal are connected to each other. Because the output from output first port 102b is at the "L" level, analog switch 70a is connected to the output terminal of operational amplifier 40c. Accordingly, the output terminal of analog switch 70a is also at that potential V1. Potential V2 is obtained such that the potential difference between logic power supply Vcc and potential V1 is voltage-divided by resistance 32b and resistance 32a, and is inputted into the −terminal of operational amplifier 33a. Potential V2 is calculated by the following formula:

$$V2 = (Vcc \times R3 + V1 \times R4)/(R3 + R4) = (Vcc \times R3 + I1 \times R1 \times R4)/(R3 + R4) \tag{6}$$

where R3 and R4 denote resistance values of resistance 32a and resistance 32b, respectively.

Current value I1 intended to flow into transfer roller 6 is determined, and potential V2 is calculated from formula (6) above. On-duty w is the ratio of the "H" level output time to cycle T of a PWM signal of voltage setting signal S100A, and is determined so as to obtain a potential equal to the above potential V2. On-duty w can be calculated by the following formula.

$$w = (\text{"H" level output time})/T \tag{7}$$

The product V0 (=Vcc×w) of logic power supply Vcc and on-duty w calculated by the formula (7) above is a potential that is supplied to the +terminal of operational amplifier 33a.

High voltage power supply 30 operates such that potential V0 and potential V2 can be equal to each other. This enables the constant current control to make current value I1 flowing through the transfer roller 6 be constant. The foregoing description is the process at Step S4. When the processing at Step S4 ends, the process proceeds to Step S5.

At Step S5, voltage conversion value v of the impedance is calculated. The calculation process of voltage conversion value v is described below.

When the impedance of transfer roller 6 and photosensitive drum 5 is R5, and a resistance value of resistance 34i is about 100 kΩ that is substantially smaller than R5, potential V3 at a connection point between diode 34h and resistance 34j is calculated by the following formula:

$$V3 = I1 \times R5 \qquad (8).$$

Potential V4 at the −terminal of operational amplifier 60c takes a partial voltage value obtained by resistance 60a and resistance 60b because the −terminal of operational amplifier 40a is virtually grounded. Potential V4 is calculated by the following formula.

$$V4 = (V3 \times R7)/(R6+R7) \qquad (9),$$

where R6 and R7 denote resistance values of resistance 60a and resistance 60b, respectively.

The +terminal of operational amplifier 60c also becomes at the same potential V4. The output terminal of operational amplifier 60c becomes at the "L" level, and a base current flows from the base common to transistor 60f and transistor 60i via resistance 60d. Current I4 flows from third analog power supply Vdd3 to resistance 60g via resistance 60e and transistor 60f. Current I4 is calculated by the following formula:

$$I4 = V4/R8 \qquad (10),$$

where R8 denotes a resistance value of resistance 60g.

Similarly, current I4 flows from third analog power supply Vdd3 via resistance 60h and transistor 60i. Here, a value of current I4 is equivalent to the detected-voltage current value.

In addition, current I3 also flows from second analog power supply Vdd2 via resistance 50d and transistor 50e. As a result, current I5, in which current I3 and current I4 are added, flows to resistance 60j as in the following formula:

$$I5 = I3 + I4 \qquad (11).$$

As a result, when both resistance values of resistance 60j and resistance 60g are each set to R8, Potential V5 at a connection point between transistor 60i and resistance 60j is calculated by the following formula:

$$V5 = I5 \times R8 \qquad (12).$$

The potential at the +terminal of operational amplifier 60k also becomes V5, and the potential at the output terminal of operational amplifier 60k also becomes V5 due to its voltage follower configuration in which the −terminal and the output terminal are connected to each other. Similarly, the potential at the output terminal of operational amplifier 60l also becomes V5. Here, potential V5 is equivalent to detected-voltage voltage value S60. A/D converter 102d coverts V5 of an analog value into a digital value g. Digital value g is calculated by the following formula:

$$g = V5/Vref \times j \qquad (13),$$

where j denotes a resolution of A/D converter 102d.

Here, resolution j is 255 (8 bit). Furthermore, Vref is a reference voltage for the PWM output and A/D converter, and is a voltage value equal to logic power supply Vcc.

Voltage conversion value v of the impedance of transfer roller 6 and photosensitive drum 5 is calculated from digital value g by the following formula:

$$v = (g/j) \times Vref \times (R6+R7)/R7 \qquad (14).$$

The foregoing describes the processing at Step S5. When the process at Step S5 ends, the process proceeds to Step S6.

At Step S6, an output resistance value is calculated. The calculation process of an output resistance value is described below.

Potential V5 can be transformed to the following formula by substituting the calculation formula above:

$$V5 = I1 \times (R5 \times R7)/(R6+R7) + I1 \times \{1+(R1/R2)\} \times R8 \qquad (15).$$

A first half part, I1×(R5×R7)/(R6+R7) of formula (15) indicates a part obtained by the impedance of transfer roller and photosensitive drum 5. A second half part, I1×{1+(R1/R2)}×R8 indicates a part obtained by an output resistance described below.

General electrophotographic printers are known in which output resistance 34j of high voltage power supply 30 having a resistance value of 30 MΩ to 100 MΩ is attached. This aims to prevent a variation of the impedance of transfer roller 6 that largely varies due to changes in temperature and/or humidity. For example, the impedance of transfer roller 6 at a high temperature and a high humidity is about 10 MΩ, while the impedance of transfer roller 6 at a low temperature and low humidity is about 200 MΩ. This shows that the impedance of transfer roller 6 varies approximately by a factor of 20, or by 20 times between at high temperature and high humidity and at low temperature and low humidity.

Meanwhile, when output resistance 34j having 30 MΩ is attached, the impedance viewed from high voltage power supply 30 becomes 40 MΩ at a high temperature and high humidity, and 230 MΩ at a low temperature and low humidity. Thus, the variation can be reduced to six times or less.

In the first embodiment, although output resistance 34j of 100 kΩ is attached, output resistance 34j is configured to generate output voltage Vo with output resistance 34j equivalently having 30 MΩ. In addition, output resistance 34j can be switched between 30 MΩ or 100 MΩ. Output resistance 34j is switched to 100 kΩ at a condition of high temperature and high humidity, or 30 MΩ at a condition of low temperature and low humidity. Accordingly, the impedance viewed from high voltage power supply 30 is 110 MΩ at high temperature and high humidity and 230 MΩ at low temperature and low humidity. Thus, the variation can be reduced to approximately two times.

An equivalent resistance of output resistance 34j is switched in response to resistance variable signal S100C outputted from second output port 102c. When resistance variable signal S100C is at the "L" level, output resistance 34j is set to 30 MΩ. When resistance variable signal S100C is at the "H" level, output resistance 34j is set to 100 MΩ. The second half part of the formula (15) is set as a voltage detected with 30 MΩ that is a part obtained by the output resistance value, and a constant of the resistance value is determined by the following formula:

$$I1 \times \{1+(R1/R2)\} \times R8 = (I1 \times 30\ M\Omega) \times R7/(R6+R7) \qquad (16);$$

$$30\ M\Omega = (1+R1/R2) \times R8 \times (R6+R7)/R7 \qquad (16)'.$$

Next, when resistance variable signal S100C is at the "H" level, a current flows into resistance 80a and resistance 80b. A voltage is applied to a gate of n-type MOSFET 80c, and current I2 flows into a source of n-type MOSFET 80c via resistance 80d. For R2 in the formula (16), a parallel connection of resistance value R9 of resistance 80d and R2 is substituted. Output resistance 34j in this case is set to 100 MΩ. As for a portion of voltage detection of 100 MΩ that is a part obtained by the output resistance value, the constant of the resistance value is determined using the following calculation formula:

$$I1 \times \{1+(R1\times(R2+R9)/R2\times R9\} \times R8=(I1\times100\ M\Omega)\times R7/(R6+R7) \quad (17);$$

$$100\ M\Omega=[\{(1+R1\times(R2+R9)\}/(R2\times R9)]\times R8\times(R6+R7)/R7 \quad (17)'.$$

With the formula (16)' and the formula (17)', high voltage power supply 30 can output a voltage obtained in the case where an output resistance 34j with a value of 30 MΩ or 100 MΩ is connected.

Whether output resistance value r is set to 30 MΩ or 100 MΩ is determined from environment value x obtained at Step S3 on the basis of Table 2.

TABLE 2

| Calculation Table for Output Resistance Value | |
|---|---|
| Output Resistance Value r | Environment Value x |
| 100 MΩ | x < 4 |
| 30 MΩ | 4 ≤ x |

The foregoing describes the processing at Step S6. When the processing at Step S6 ends, the process proceeds to Step S7.

At Step S7, output set voltage f is calculated to be applied to recording medium KB. This calculation process is described below. Firstly, values of coefficient c and coefficient dare determined from the value of environment value x on the basis of Table 3.

TABLE 3

| Calculation Table for Coefficient c and Coefficient d | | |
|---|---|---|
| Environment Value x | Coefficient c | Coefficient d |
| 1 | 0.9 | 2.2 |
| 2 | 0.9 | 2.3 |
| 3 | 0.9 | 2.4 |
| 4 | 0.9 | 1.4 |
| 5 | 0.9 | 1.5 |
| 6 | 0.9 | 1.6 |
| 7 | 0.9 | 1.7 |
| 8 | 0.9 | 1.8 |

After values of coefficient c and coefficient d relative to environment value x are determined on the basis of Table 3, output set voltage f is calculated using impedance voltage conversion value v by the following formula:

$$f=c\times v+d\times1000 \quad (18).$$

In Table 1, the small value of environment value x indicates a high temperature and high humidity condition, while the large value thereof indicates a low temperature and low humidity condition. The large impedance of transfer roller 6 and photosensitive drum 5 at a low temperature and low humidity results in a large impedance voltage conversion value v. The large impedance makes a transfer current difficult to flow, and thus a large value of output set voltage f is necessary. As a result, as illustrated in Table 3, when a value of environment value x is from 4 to 8, the value of coefficient d is gradually increased to obtain a high output set voltage.

On the other hand, the small impedance of transfer roller 6 and photosensitive drum 5 at a high temperature and high humidity condition results in a small impedance voltage conversion value v. The small impedance makes a transfer current easy to flow, and thus a small value of output set voltage f is necessary. However, when a value of environment value x is from 1 to 3, the output resistance is set to 100 MΩ, not to 30 MΩ. As a result, a large total impedance makes a transfer current difficult to flow, and thus a large output set voltage f is necessary.

Accordingly, as illustrated in Table 3, a value of coefficient d when the environment value x is from 1 to 3 is gradually increased so as to be larger than a value of coefficient d when the value of environment value x is from 4 to 8. The foregoing describes the processing at Step S7. When the processing at Step S7 ends, the process proceeds to Step S8.

At Step S8, a determination is made as to whether output resistance value r calculated at Step S6 is 30 MΩ or 100 MΩ. If output resistance value r is 30 MΩ, the process proceeds to Step S9. At Step S9, resistance variable signal S100C outputted from second output port 102c is maintained at the "L" level that is the initial value, and the processing proceeds to Step S11. On the other hand, if a determination is made at Step S8 that output resistance value r is 30 MΩ, the processing proceeds to Step S10. At Step S10, resistance variable signal S100C outputted from second output port 102c is switched from the "L" level to the "H" level, and the processing proceeds to Step S11.

At Step S11, on the basis of medium position information detected by medium sensor 19, selection signal S100B outputted from first output port 102b is switched from the "L" level to the "H" level at a timing when a leading end of recording medium KB progresses in several millimeters after being brought into contact with transfer roller 6 and photosensitive drum 5. When selection signal S100B is switched from the "L" level to the "H" level, the output terminal of analog switch 70a is switched from the output terminal of operational amplifier 40c to the output terminal of operational amplifier 60k. As a result, in high voltage power supply 30, a constant current control method in which current I1 flowing into transfer roller 6 is constant is switched to a constant voltage control method in which output set voltage f is constant. When the processing at Step S11 ends, the process proceeds to Step S12.

At Step 12, on-duty w of voltage setting signal S100A outputted from first PWM output port 102a is calculated to change to the calculated on-duty w. Firstly, potential V5 corresponding to output set voltage f is calculated by the following formula:

$$V5=f\times R7/(R6+R7) \quad (19).$$

Potential V5 is voltage-divided by pull-up resistance 32b and resistance 32a to convert it into potential V2. Potential V2 can be calculated by the following formula:

$$V2=(Vcc\times R3+V5\times R4)/(R3+R4) \quad (20),$$

where R3 and R4 denote resistance values of resistance 32a and resistance 32b, respectively.

Here, on-duty w of voltage setting signal 100A outputted from first PWM output port 102a by the formula (7) is changed such that potential V0 is in coincidence with potential V2. Accordingly, a feedback control is performed such that potential V2 at the −terminal of operational amplifier 33a is in coincidence with potential V0. When the processing at Step S12 ends, the process proceeds to Step S13.

Here, a circuit operation of the constant voltage control method is described. Firstly, even if a current value flowing into transfer roller 6 varies, potential V5 does not vary. Assuming that a current value flowing into transfer roller 6 is increased by $\Delta I1$ from I1 to I1$a$, and that potential V3 is varied to potential V3$a$, the following formula holds:

$$I1a = I1 + \Delta I1 \quad (21).$$

As a result, potential V4 is varied to potential V4$a$ in the following formula:

$$V4a = V3a \times R7/(R6+R7) \quad (22).$$

Because potential V4 is varied to potential V4$a$, current I5 is also varied to I5$a$:

$$V4a = I5a \times R8 \quad (23).$$

Because current I1 is increased by $\Delta I1$, potential V1 is increased by $\Delta V1$ to potential V1$a$:

$$\Delta V1 = \Delta I1 \times R1 \quad (24), \text{ and}$$

$$V1a = V1 + \Delta V1 = V1 + \Delta I1 \times R1 \quad (25).$$

Because potential V1 is varied to potential V1$a$, current I2 is also varied to I2$a$:

$$I2a = V1a/R2 = (V1 + \Delta I1 \times R1)/R2 \quad (26).$$

Similarly, current I3 is also varied to I3$a$:

$$I3a = I1a + I2a \quad (27).$$

From formula (24) to formula (27), it follows that I3$a$ can be converted as follows:

$$I3a = (I1+I2) + (1+R1/R2) \times \Delta I1 \quad (28).$$

Even when a current varies, the potential V5 does not vary and thus the current I5 does not vary.

$$I5a = I5 = I3a + I4a \quad (29)$$

$$V5 = I5a \times R8 = \{(I1+I2) + (1+R1/R2)\} \times R8 \times \Delta I1 + V4a \quad (30)$$

If current I1 is increased by $\Delta I1$, potential V5 does not vary. Under this condition, the formula (15) and the formula (30) are the same. If the formula (15) and the formula (30) are equated, the following is obtained:

$$V3a = V3 - (1+R1/R2) \times R8 \times (R6+R7)/R7 \times \Delta I1.$$

From the formula (16)', the following is obtained:

$$V3a = V3 - 30 \text{ M}\Omega \times \Delta I1 \quad (31).$$

This is equivalent to a potential obtained by a circuit in which output resistance 34$j$ having 30 M$\Omega$ is attached.

Similarly, when resistance variable signal S100C outputted from second output port 102$c$ is at the "H" level, from formula (17)', the following is obtained.

$$V3a = V3 - 100 \text{ M}\Omega \times \Delta I1 \quad (32)$$

This is equivalent to a potential obtained by a circuit in which output resistance 34$j$ having 100 M$\Omega$ is attached.

In this manner, resistance variable signal S100C outputted from second output port 102$c$ is switched between the "L" level and the "H" level to allow the value of output resistance 34$j$ to be switched.

At Step S13, on the basis of the medium position information detected by medium sensor 19, the on-duty of voltage setting signal S100A outputted from first PWM output port 102$a$ is set to "0" at a timing when a tail end of recording medium KB is located at a point that is several millimeters before being in non-contact with transfer roller 6 and photosensitive drum 5. The electric charge of capacitor 31$c$ is discharged, and potential V0 also becomes 0 V. The output from operational amplifier 33$a$ becomes at the "L" level, the base voltage of transistor 34$e$ also becomes 0 V, and the collector current of transistor 34$e$ does not flow. As a result, the output from high voltage power supply 30 is made to be off, and the processing proceeds to Step S14. At Step S14, the operation of transferring toner 23 onto recording medium KB is completed, and the process proceeds to Step S15.

At Step S15, selection signal S100B outputted from first output port 102$b$ is switched to the "L" level. As a result, all the output signals from first PWM output port 102$a$, first output port 102$b$, and second output port 102$c$ are the same as the initial values, and the processing ends.

Here, steam quantity a is calculated from temperature t and humidity h, and environment value x is calculated on the basis of the calculation result of steam quantity a. Alternatively, a simple table for temperature t and humidity h may be created, and environment value x may be calculated on the basis of the table.

An advantage of switching an output resistance on the basis of environment value x is described next.

Figure 7:
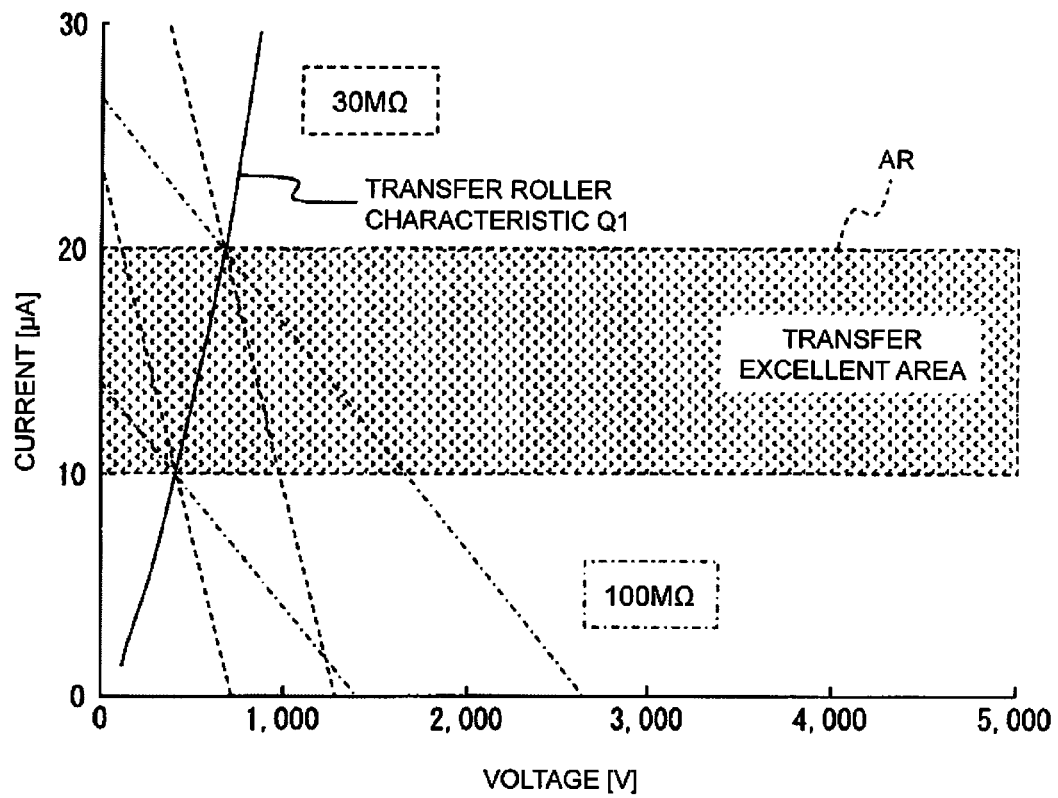
FIG. 7 is a characteristic graph illustrating a relation between a transfer voltage and a transfer current at a high temperature and high humidity.

FIG. 7 is a characteristic graph illustrating a relation between a transfer voltage and a transfer current at a high temperature and high humidity. The graph illustrates voltage/current characteristics of transfer roller 6 at a high temperature and high humidity, and a difference between when the output resistance is set to 30 M$\Omega$ and to 100 M$\Omega$. When the output set voltage is excessively high and the transfer current is excessively large, a discharge between transfer roller 6 and recording medium KB is generated to cause a transfer failure, such as "transfer void," in which toner 23 is omitted only at the discharged portion. In contrast, when the output set voltage is excessively low and the transfer current is excessively small, a transfer failure such as "patchy" is generated that toner 23 is not transferred onto recording medium KB but remains on photosensitive drum 5. An area where no transfer failure is generated is set as transfer excellent area AR. Here, the transfer excellent area is assumed to be the case where a transfer current of 10 to 20 $\mu$A flows. The low impedance of transfer roller 6 at a high temperature and high humidity makes the transfer current easy to flow.

As a result, it is understood that the wider range of the output set voltage can be obtained in the case where output resistance 34$j$ is set to 100 M$\Omega$, compared with the case where output resistance 34$j$ is set to 30 M$\Omega$.

Figure 8:
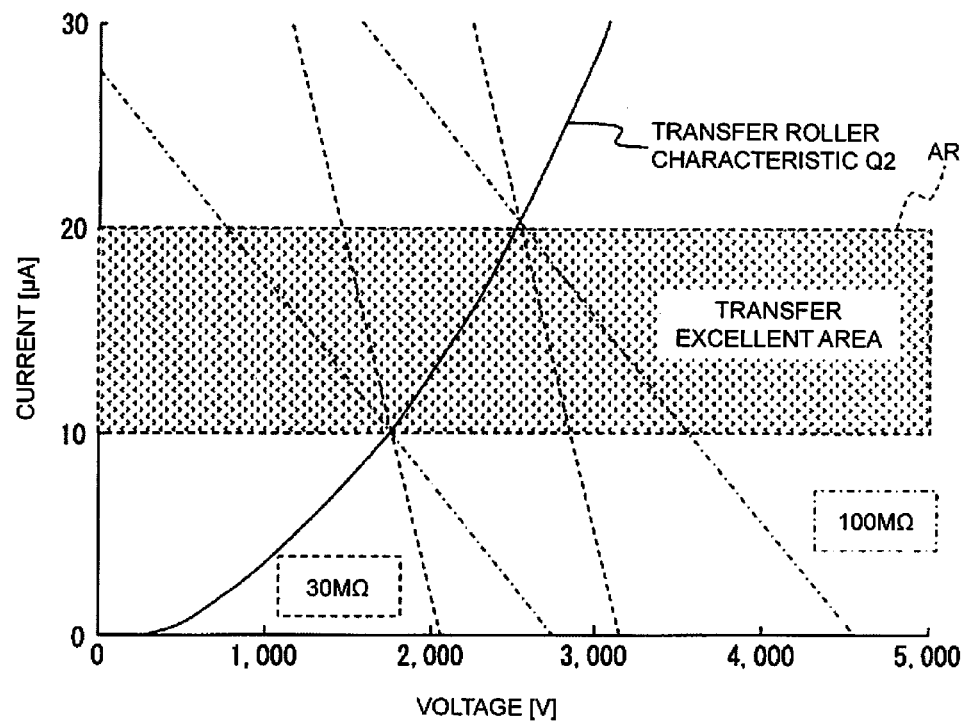
FIG. 8 is a characteristic graph illustrating a relation between a transfer voltage and a transfer current at a low temperature and low humidity.

FIG. 8 is a characteristic graph illustrating a relation between a transfer voltage and a transfer current at a low temperature and low humidity. Unlike the case at a high temperature and high humidity, the high impedance of transfer roller 6 at a low temperature and low humidity makes the transfer current difficult to flow. Similar to the case at a high temperature and high humidity, it is understood that the wider range of the output set voltage can be obtained in the case where the output resistance is set to 100 M$\Omega$, compared with the case where the output resistance is set to 30 M$\Omega$.

Furthermore, unlike the case at a high temperature and high humidity, it is understood that the impedance of transfer roller 6 at a low temperature and low humidity is sufficiently high to allow the sufficiently wide range of the output set voltage to be obtained even when the output resistance is set to 30 M$\Omega$. It is understood that high voltage power supply 30 is required to have a higher transfer voltage supply ability when the output resistance at a low temperature and low humidity condition is set to 100 M$\Omega$, compared with the case where the output resistance is set to 30 M$\Omega$. When high voltage power supply 30 has a higher transfer voltage supply ability, it is necessary to increase the breakdown voltage of a diode and a capacitor. This causes such a disadvantage in that it increases the cost. Therefore, output resistance 34j at a low temperature and low humidity condition is preferably set to 30 MΩ.

Here, output resistance 34j is calculated on the basis of environment value x. Alternatively, output resistance 34j may be calculated on the basis of the conveyance speed, the type, the weight, the size, and the like of recording medium KB. For example, when recording medium KB is a special medium having a high impedance, such as OHP paper has, a transfer current is difficult to flow therethrough. Therefore, the output resistance is preferably set to 100 MΩ independent of environment value x. In addition, also in the case of a special medium having a narrow transfer excellent area, such as a postcard, the output resistance is preferably set to 100 MΩ independent of environment value x.

Here, although the resolutions in the 8 bits of A/D converters 102d, 102e, and 102f and the PWM first output is explained, the resolution is raised to allow a setting error of output set voltage f to be further reduced.

(Effect of First Embodiment)

With the first embodiment of the invention, environment value x is calculated on the basis of temperature t and humidity h, and a predetermined resistance value conversion section 50 is switched on the basis of environment value x thus calculated, so that an equivalent resistance value of output resistance 34j in high voltage power supply 30 is switched. This exhibits effects (1) and (2) below.

(1) At a high temperature and high humidity condition, an equivalent output resistance value is switched to a high impedance, for example 100 MΩ, to allow for the wide range of the output set voltage. This can eliminate a transfer failure.

(2) At a low temperature and low humidity condition, an equivalent output resistance value is switched to a low impedance, for example 30 MΩ, to allow for a low transfer supply voltage value of high voltage power supply 30 to be maintained. This allows high voltage power supply 30 to be configured by a diode and a capacitor having a low breakdown voltage, so that a cost of components of high voltage power supply 30, such as the diode and the capacitor, can be reduced.

Second Embodiment

Configuration of Second Embodiment

Figure 9:
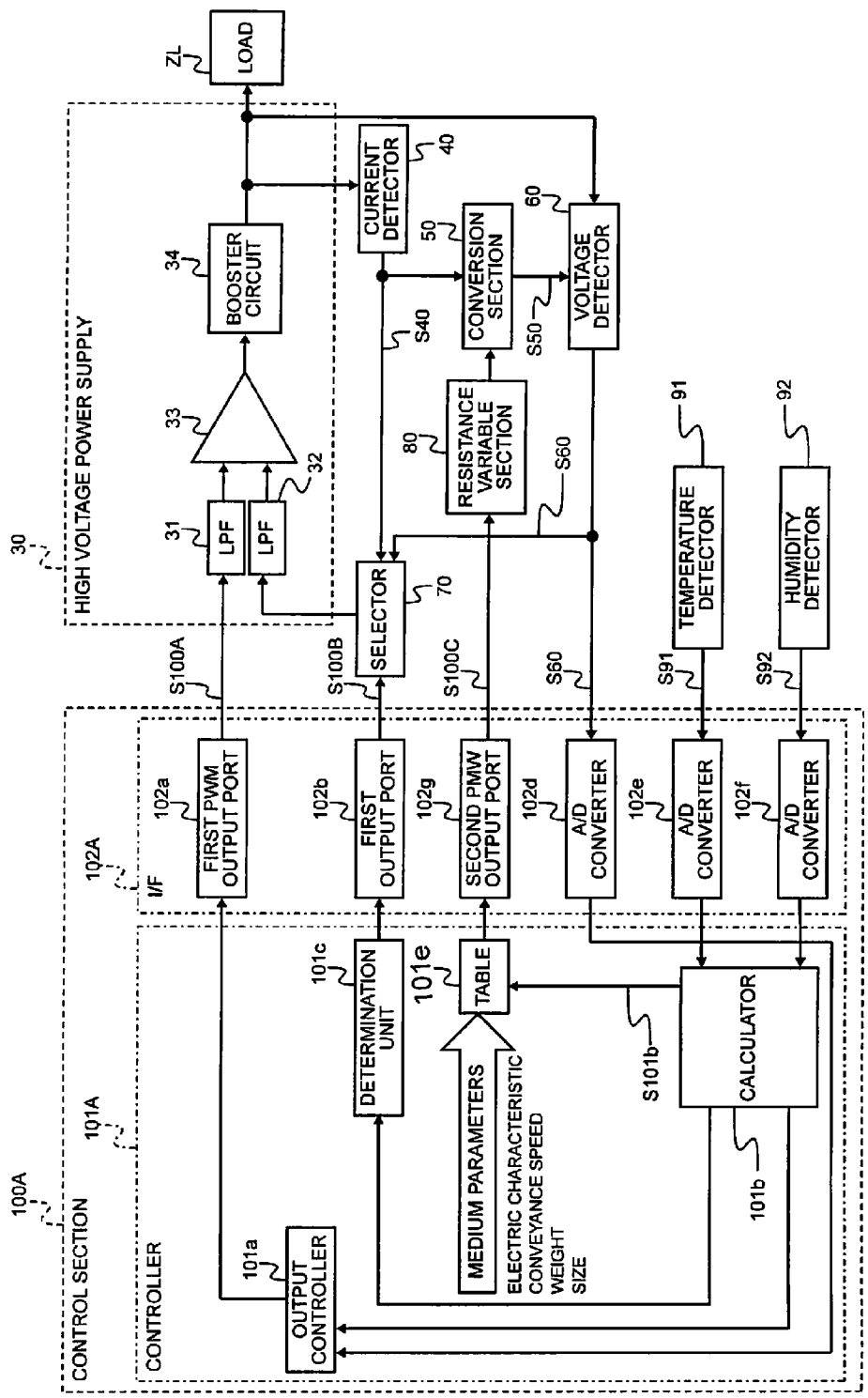
FIG. 9 is a block diagram schematically illustrating a high voltage power supply system according to a second embodiment of the invention.

FIG. 9 is a block diagram schematically illustrating high voltage power supply 30 and a control section thereof in an image formation apparatus according to a second embodiment of the invention. The same reference numerals are given to the elements common to those in FIG. 1 that illustrates the first embodiment.

A high voltage power supply system in the second embodiment is configured to include high voltage power supply 30, current detector 40, conversion section 50, voltage detector 60, selector 70, resistance variable section 80, temperature detector 91, and humidity detector 92, which are similar to those in the first embodiment, and control section 100A having a function different from that in the first embodiment. Control section 100A is configured to include controller 101A and I/F 102A having functions different from those in the first embodiment.

Controller 101A includes output controller 101a, calculator 101b, and determination unit 101c, which are similar to those in the first embodiment, and table 101e in place of table 101d in the first embodiment, which is different from table 101d. I/F 102A includes second PWM output port 102g that outputs a PWM signal, in place of second output port 102c in I/F 102 in the first embodiment. Other configurations in the second embodiment are similar to the configurations in the first embodiment.

(Operation in Second Embodiment)

The overall operation of the image formation apparatus 1 in the second embodiment is similar to the operation in the first embodiment, and thus a description thereof is omitted. The operation of the high voltage power supply system in the second embodiment that is different from the operation in the first embodiment is described below.

Figure 10:
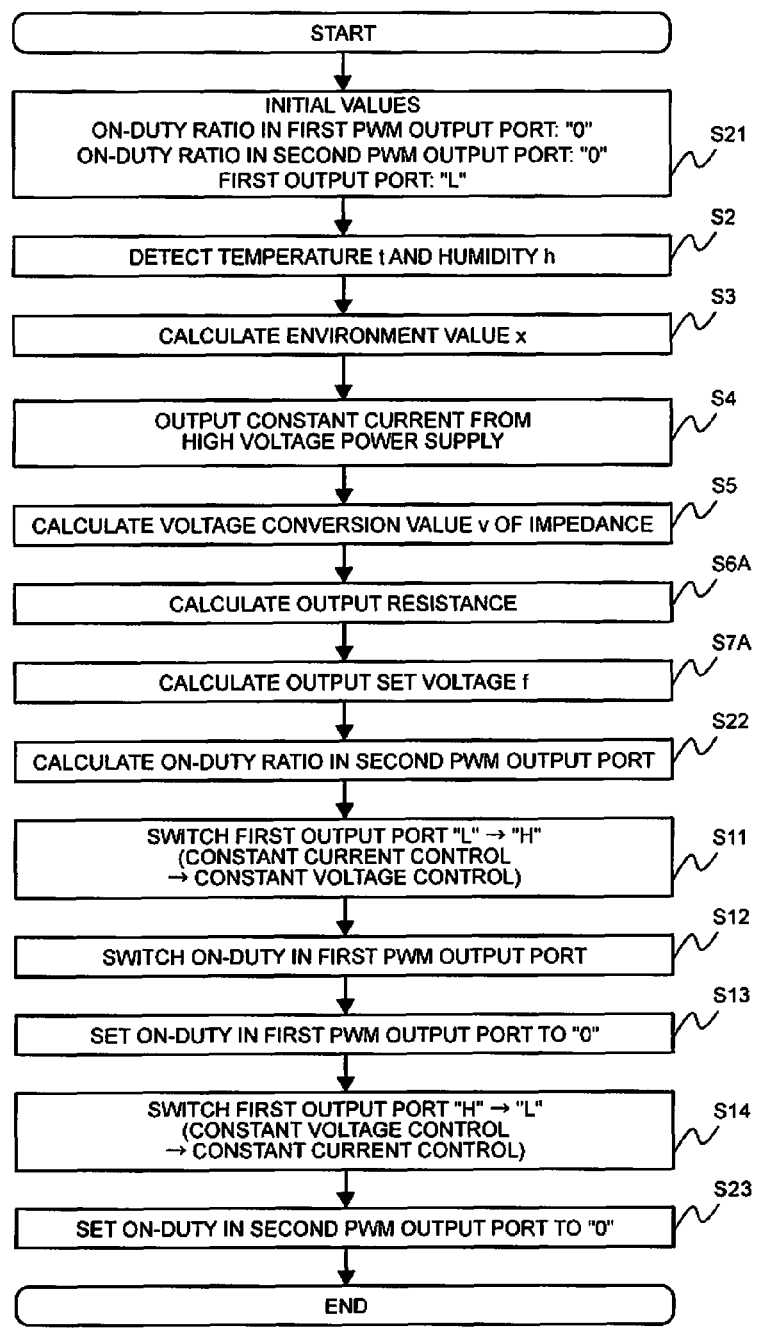
FIG. 10 is a flowchart illustrating a process of the high voltage power supply system in FIG. 9.

FIG. 10 is a flowchart illustrating processes of the high voltage power supply system in FIG. 9. The same reference numerals are given to the elements common to those in FIG. 5 that illustrates the first embodiment.

In single-sided printing, a circuit operation of the high voltage power supply system before high voltage power supply 30 starts to supply a voltage and a current to transfer roller 6 and until it stops doing so is described using the block diagram of FIG. 9 and the flowchart of FIG. 10.

Upon starting the process by high voltage power supply system in the second embodiment, the process proceeds to Step S21. At Step S21, first PWM output port 102a, first output port 102b, and second PWM output port 102g are initialized. First PWM output port 102a is set to on-duty "0", first output port 102b is set to the "L" level, and second PWM output port 102g is set to on-duty "0". Then the process proceeds to Step S2.

From Step S2 to Step S5, processes similar to those in the first embodiment are performed. In other words, at Step S2, A/D converter 102e converts an electric signal detected by temperature sensor 91 into a digital value to detect temperature t, and A/D converter 102f converts an electric signal detected by humidity sensor 92 into a digital value to detect humidity h, and the process proceeds to Step S3. At Step S3, environment value x is calculated on the basis of temperature t, and humidity h is detected in a similar manner as in the first embodiment, and the process proceeds to Step S4. At Step S4, the on-duty of voltage setting signal S100A outputted from first PWM output port 102a is changed, and a constant current output process starts in which current value I1 from high voltage power supply 30 is made to be constant. The processing then proceeds to Step S5. At Step S5, voltage conversion value v of an impedance is calculated, and the processing proceeds to Step S6A.

At Step S6A, output resistance r is calculated in accordance with Table 4 in place of Table 2 in the first embodiment, and the processing proceeds to Step S7A.

TABLE 4

Calculation Table for Output Resistance Value

| Output Resistance Value r | Environment Value x |
|---|---|
| 100 MΩ | 1 |
| 90 MΩ | 2 |
| 80 MΩ | 3 |
| 70 MΩ | 4 |
| 60 MΩ | 5 |
| 50 MΩ | 6 |
| 40 MΩ | 7 |
| 30 MΩ | 8 |

At Step S7A, values of coefficient c and coefficient d are determined from environment value x on the basis of Table as a calculation table in place of Table 3 in the first embodiment. Similar to the first embodiment, coefficient c, coefficient d, and impedance voltage conversion value v are used to calculate output set voltage f by the formula (18), and the processing proceeds to Step S22.

TABLE 5

Calculation Table for Coefficient c and Coefficient d

| Environment Value x | Coefficient c | Coefficient d |
|---|---|---|
| 1 | 0.9 | 2.2 |
| 2 | 0.9 | 2.3 |
| 3 | 0.9 | 2.1 |
| 4 | 0.9 | 2.0 |
| 5 | 0.9 | 1.95 |
| 6 | 0.9 | 1.9 |
| 7 | 0.9 | 1.85 |
| 8 | 0.9 | 1.8 |

At Step S22, on-duty z of resistance variable signal S100C outputted from second PWM output port 102g is calculated in accordance with Table 6.

TABLE 6

Calculation Table for On Duty z

| On Duty z | Resistance r | Resistance R2' |
|---|---|---|
| 1 | 100 MΩ | 1.165 kΩ |
| 0.96 | 90 MΩ | 1.303 kΩ |
| 0.91 | 80 MΩ | 1.477 kΩ |
| 0.84 | 70 MΩ | 1.705 kΩ |
| 0.75 | 60 MΩ | 2.020 kΩ |
| 0.61 | 50 MΩ | 2.475 kΩ |
| 0.39 | 40 MΩ | 3.190 kΩ |
| 0 | 30 MΩ | 4.500 kΩ |

Here, the condition for the on-duty calculation in Table 6 is as follows:

$R1=20$ kΩ, $R6=50$ kΩ, $R7=20$ kΩ, and $R8=2.2$ kΩ.

Furthermore, resistance value R2' in Table 6 is a resistance value that is calculated by a substitution of the output resistance value as R2 in the formula (16)'. In a case of $R2=4.5$ kΩ and $R9=1.165$ kΩ, an on-time and an off-time of n-type MOSFET 80c are adjusted to allow for a variable resistance value of R2'. The on-time and the off-time of n-type MOSFET 80c can be adjusted in such a manner that the on-duty of second PWM output port 102g is adjusted. The on-time of n-type MOSFET 80c can be calculated in such a manner that w is replaced with z in the formula (7). Cycle T of the PWM signal is a value sufficiently smaller than that of the conveyance speed of recording medium KB.

The resistance value of R2' is calculated by the following formula, $$R2'=R2\times(1-z)/j+R10\times z \quad (33):$$

where R10 denotes a parallel combined resistance value of R2 and R9.

The foregoing describes the process at Step S22. When the processing at Step S22 ends, the processing proceeds to Step S11. From Step S11 to Step S14, processes similar to those in the first embodiment are performed. In other words, at Step S11, selection signal S100B outputted from first output port 102b is switched from the "L" level to the "H" level to switch the constant current control to the constant voltage control, and the processing proceeds to Step S12. At Step S12, the on-duty of first PWM output port 102a is switched in accordance with output set voltage f, and the processing proceeds to Step S13. At Step S13, the on-duty of first PWM output port 102a is changed to "0", the output from high voltage power supply 30 is made to be off, and the processing proceeds to Step S14. At Step S14, the voltage level of first output port 102b is switched from the "H" level to the "L" level, the control for high voltage power supply 30 is switched from the constant voltage control to the constant current control, and the processing proceeds to Step S23.

At Step S23, the on-duty of second PWM output port 102g is changed to "0", and the output resistance is returned to 30 MΩ that is the same as the initial value. The output resistance to environment value x can be switched to either one of 30 MΩ and 100 MΩ in the first embodiment. In contrast, the output resistance to environment value x can be switched within a range from 30 MΩ to 100 MΩ stepwise in units of 10 MΩ in the second embodiment.

Figure 11:
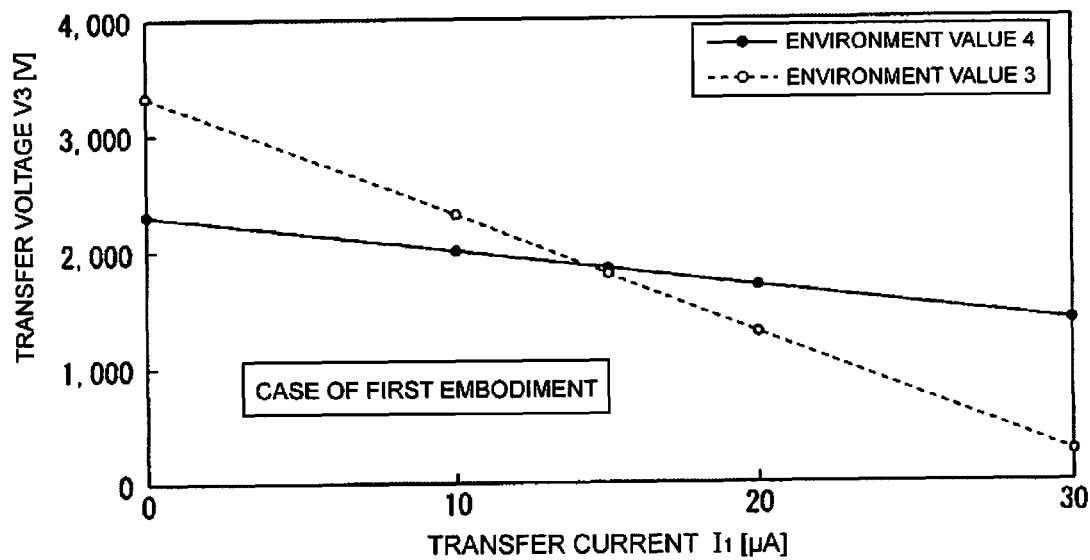
FIG. 11 is a characteristic graph illustrating a relation between the transfer voltage and the transfer current in the first embodiment.

FIG. 11 is a characteristic graph illustrating a relation between a transfer voltage and a transfer current in the first embodiment. In FIG. 11, the horizontal axis represents transfer current I1 and the longitudinal axis represents transfer voltage V3. The values of transfer voltage V3 when transfer current I1 is 0 is the same as the value of output set voltage f. Voltage conversion value v of the impedance in this case is set to 1000 V for both environment values. An output resistance is set to 100 MΩ for environment value 3, and an output resistance is set to 30 MΩ for environment value 4. Transfer voltage V3 varies largely with respect to transfer current I1 between environment values x of 3 and 4. Accordingly, when environment value 3 or 4 is incorrectly detected, characteristics of the transfer voltage and the transfer current vary largely.

Figure 12:
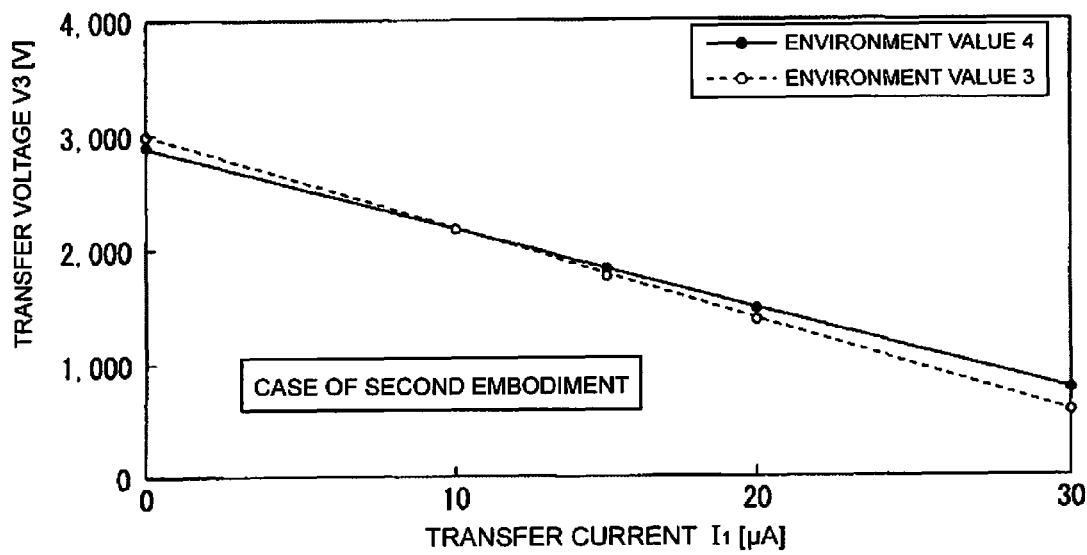
FIG. 12 is a characteristic graph illustrating a relation between the transfer voltage and the transfer current in the second embodiment.

FIG. 12 is a characteristic graph illustrating the relation between a transfer voltage and a transfer current in the second embodiment. The horizontal axis and the longitudinal axis in FIG. 12 are similar to those in FIG. 11. An output resistance is set to 80 MΩ for environment value 3, and an output resistance is set to 70 MΩ for environment value 4. Transfer voltage V3 is unlikely to vary largely with respect to transfer current I1 between environment values x of 3 and 4. Accordingly, when environment value of 3 or 4 is incorrectly detected, characteristics of the transfer voltage and the transfer current vary less.

Here, the example in which the output resistance is determined on the basis of environment value x is presented, but the output resistance may be calculated directly from the steam quantity. With the latter calculation method, if linear steam quantity and linear output resistance are used instead of the output resistance stepwise in 10 MΩ, then the transfer voltage and transfer current characteristics can be approximated to appropriate values more finely.

(Effect of Second Embodiment)

With the second embodiment, a predetermined resistance value is switched in a unit of 10 MΩ on the basis of the detection result of environment value x. This can prevent a variation of the transfer characteristics due to the difference between environment values x of 3 and 4 to allow a transfer failure to be eliminated even when environment value x is incorrectly detected.

Modification Example

The invention is not limited to the abovementioned first and second embodiments, but various utilization forms or modification examples can be made. Such a utilization form or a modification example includes (1) and (2) below, for example.

(1) In the explanations in the first and second embodiments, although an explanation is made for high voltage power supply 30 configured to output output voltage Vo and output current Io to transfer roller 6, the output destination of output voltage Vo and output current Io from high voltage power supply 30 is not limited to transfer roller 6. Alternatively, the output destination of high voltage power supply 30 may be set to charge roller 21, toner supply roller 23, or development roller 24, and each output voltage Vo and each output current Io that are supplied thereto may be controlled in accordance with a temperature detection value and a humidity detection value.

(2) In the explanations of the first and second embodiments, although the image formation apparatus is a printer that uses the electrophotography system, the image formation apparatus can be also applied to a copier, a multi-function printer, and the like.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A high voltage power supply system comprising:
   a high voltage power supply configured to output an output voltage and an output current to be applied to a load on the basis of a voltage setting signal;
   a current detector configured to detect a first current value corresponding to the output current, to create a first voltage value by multiplying the first current value by a first resistance value, and to output the first voltage value;
   a conversion section configured to obtain a second current value by dividing the first voltage value by a second resistance value, and to output the second current value;
   a voltage detector configured to obtain a third current value by dividing the output voltage by a third resistance value, and to add the second current value with the third current value to obtain a fourth current value, and to convert the fourth current value to a second voltage value by multiplying the fourth current value by a fourth resistance value, and to output the second voltage value;
   a selector configured to select, as a selected voltage value, one of the first voltage value and the detected voltage second voltage value on the basis of a selection signal, and output the selected voltage value;
   a resistance variable section configured to change the first resistance value on the basis of a resistance variable signal;
   a temperature detector configured to detect a temperature in the high voltage power supply system, and output the detected temperature as a detected-temperature value;
   a humidity detector configured to detect an ambient humidity of the load, and output the detected humidity as a detected-humidity value; and
   a control section configured to create the voltage setting signal, the selection signal, and the resistance variable signal on the basis of the second voltage value, the detected-temperature value, and the detected-humidity value, and to apply the voltage setting signal to the high voltage power supply, the selection signal to the selector, and the resistance variable signal to the resistance variable section.

2. The high voltage power supply system according to claim 1, where the resistance variable section includes:
   resistors; and
   a switch element configured to change a combined resistance value of the resistors by performing an on/off operation on the basis of the resistance variable signal.

3. The high voltage power supply system according to claim 2, wherein
   the resistance variable signal is a pulse width modulation signal, and
   the switch element switches an on-duty cycle of the pulse modulation signal to change the combined resistance value in accordance with the on-duty cycle.

4. The high voltage power supply system according to claim 1, wherein the control section obtains steam quantity from the detected-temperature value and the detected-humidity value, and creates the resistance variable signal on the basis of the steam quantity.

5. The high voltage power supply system according to claim 1, wherein the load is a transfer roller configured to transfer an image formed on an image carrier onto a recording medium.

6. An image formation apparatus comprising:
   the high voltage power supply system according to claim 5; and
   the transfer roller according to claim 5, wherein
   the control section gives the resistance variable section the resistance variable signal for correcting the predetermined resistance value, on the basis of an electric characteristic of the recording medium, a speed of conveyance of the recording medium to the transfer roller, a weight of the recording medium, and a size of the recording medium.

* * * * *